US010721432B2

(12) United States Patent
Koike

(10) Patent No.: US 10,721,432 B2
(45) Date of Patent: Jul. 21, 2020

(54) IMAGE CAPTURING APPARATUS CONNECTABLE TO DISPLAY APPARATUS, DISPLAY APPARATUS CONNECTABLE TO EXTERNAL APPARATUS, AND IMAGE PROCESSING APPARATUS PERFORMING IMAGE PROCESSING

(71) Applicant: CANON KABUSHIKI KAISHA, Tokyo (JP)

(72) Inventor: Toru Koike, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 87 days.

(21) Appl. No.: 15/491,391

(22) Filed: Apr. 19, 2017

(65) Prior Publication Data

US 2017/0310921 A1    Oct. 26, 2017

(30) Foreign Application Priority Data

Apr. 25, 2016   (JP) ................. 2016-087340

(51) Int. Cl.
*H04N 5/57*   (2006.01)
*H04N 5/445*   (2011.01)
*H04N 5/52*   (2006.01)
*H04N 5/232*   (2006.01)

(52) U.S. Cl.
CPC .......... *H04N 5/57* (2013.01); *H04N 5/23293* (2013.01); *H04N 5/44504* (2013.01); *H04N 5/52* (2013.01)

(58) Field of Classification Search
CPC ........ H04N 5/57; H04N 5/23293; H04N 5/52; H04N 5/44504
See application file for complete search history.

(56) References Cited

U.S. PATENT DOCUMENTS

| 5,343,238 | A | * | 8/1994 | Takata | .......... G06T 3/4007 |
| | | | | | 348/556 |
| 7,212,238 | B2 | * | 5/2007 | Ohtsuki | .......... H04N 5/14 |
| | | | | | 348/240.2 |
| 2018/0241979 | A1 | * | 8/2018 | Kanda | .......... H04N 5/57 |

FOREIGN PATENT DOCUMENTS

| JP | 2003-195849 A | 7/2003 |
| JP | 2004-221750 A | 8/2004 |
| JP | 2014-531821 A | 11/2014 |
| JP | 2015-141333 A | 8/2015 |
| WO | 2016/002154 A1 | 1/2016 |

* cited by examiner

*Primary Examiner* — Twyler L Haskins
*Assistant Examiner* — Angel L Garces-Rivera
(74) *Attorney, Agent, or Firm* — Canon U.S.A., Inc. IP Division

(57) ABSTRACT

An image capturing apparatus includes a graphic image generation unit configured to generate a graphic image, a communication control unit configured to obtain, from a display apparatus, conversion characteristic information indicating a relationship between a pixel value of a display image based on a captured image input from the image capturing apparatus to the display apparatus and a display luminance value in a state in which the display image is displayed on the display apparatus, and a video output unit configured to output, to the display apparatus together with a captured image, a corrected graphic image obtained by correcting a pixel value of the graphic image based on the conversion characteristic information and a target value of a display luminance value of the graphic image when the graphic image is displayed on the display apparatus.

17 Claims, 17 Drawing Sheets

FIG.5A

TYPE OF CONVERSION CHARACTERISTICS = 1
(NORMALIZING METHOD)

| SIGNAL REFERENCE VALUE (%) | DISPLAY LUMINANCE (nit) |
|---|---|
| 800 | 400 |
| 400 | 200 |
| 200 | 100 |
| 100 | 50 |

FIG.5B

TYPE OF CONVERSION CHARACTERISTICS = 2
(LIMITING METHOD)

| SIGNAL REFERENCE VALUE (%) | DISPLAY LUMINANCE (nit) |
|---|---|
| 800 | 400 |
| 400 | 400 |
| 200 | 200 |
| 100 | 100 |

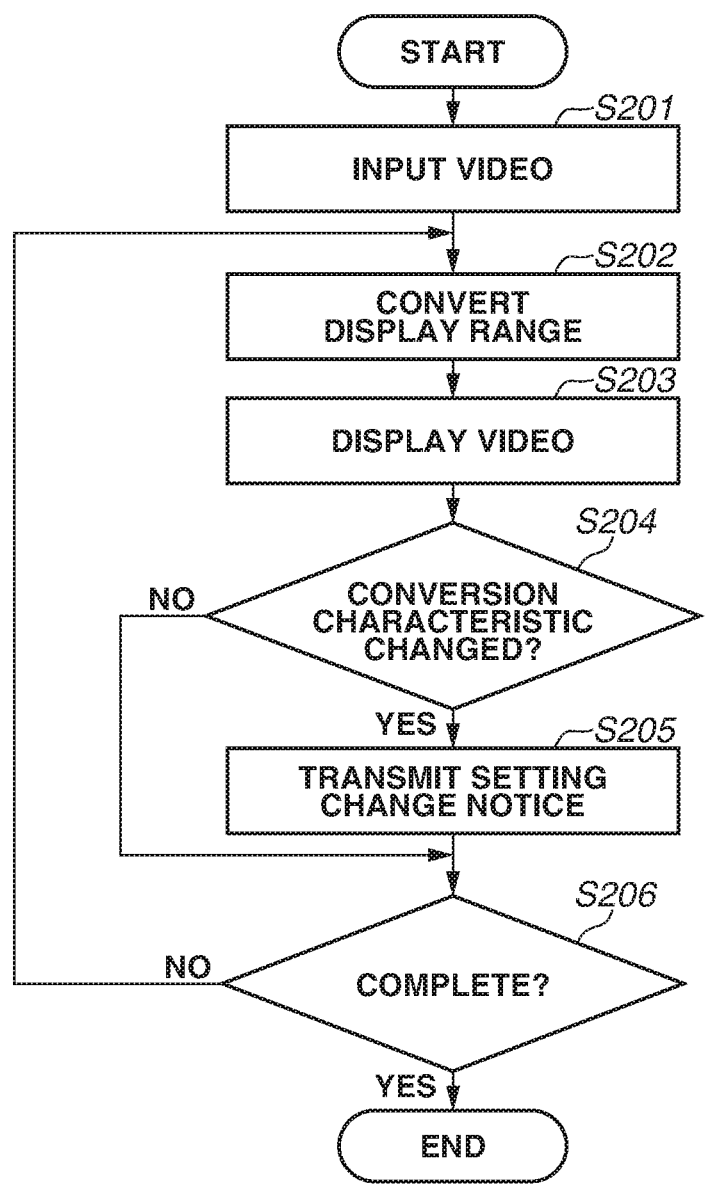

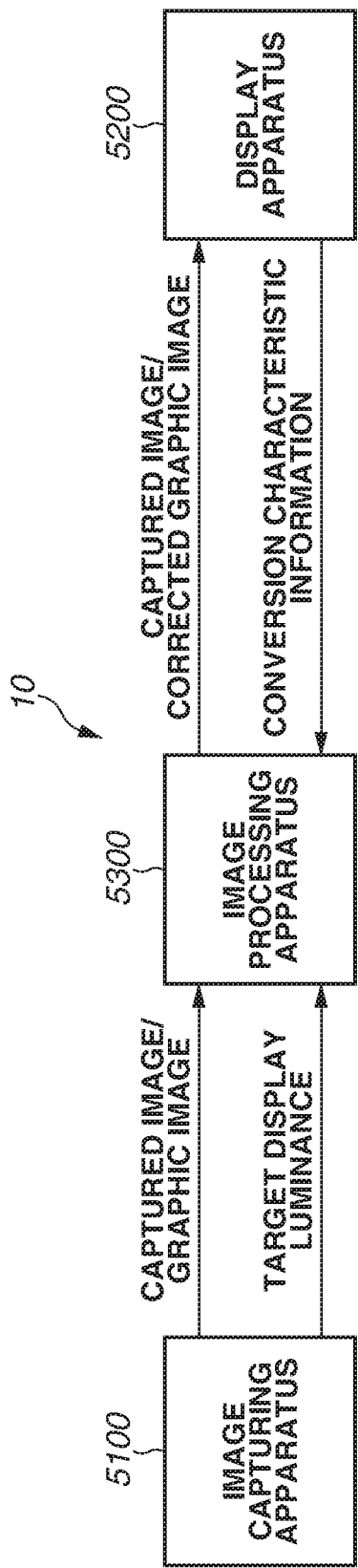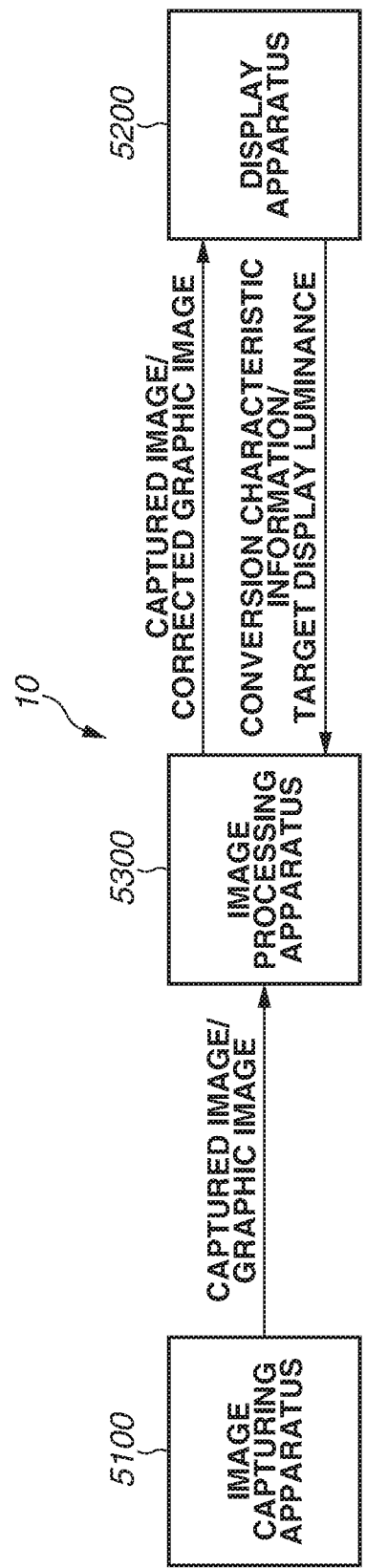

IMAGE CAPTURING APPARATUS CONNECTABLE TO DISPLAY APPARATUS, DISPLAY APPARATUS CONNECTABLE TO EXTERNAL APPARATUS, AND IMAGE PROCESSING APPARATUS PERFORMING IMAGE PROCESSING

BACKGROUND

Technical Field

The aspect of the embodiments relates to an image capturing apparatus connectable to a display apparatus, the display apparatus connectable to an external apparatus, and an image processing apparatus which performs image processing.

Description of the Related Art

Techniques are conventionally known which superimpose setting screens including texts on display screens and display the screens. Japanese Patent Application Laid-Open No. 2004-221750 describes a technique for correcting quality of a display image and an on screen display (OSD) image based on luminance levels of the display image and the OSD image.

When a range of pixel values of an input image exceeds a range of displayable luminance, a display apparatus performs display range conversion processing for assigning the pixel values of the input image to the range of displayable luminance. When a display image having a wide pixel value range and a graphic image such as an OSD image to be displayed by being superimposed on the display image are input to such display apparatus, the display range conversion processing is performed on not only the display image but also the OSD image.

When a user changes display range conversion characteristics according to luminance of the display image, assignment of the lisp-ay luminance with respect to the pixel values of the input image is changed. Accordingly, there is an issue that visibility of the OSD image may be lowered in some cases because the display luminance of the OSD image is changed.

SUMMARY OF THE INVENTION

According to an aspect of the embodiments, an image capturing apparatus includes an image capturing unit configured to generate a captured image of an object, an image generation unit configured to generate a graphic image to be displayed on a display apparatus, an information obtaining unit configured to obtain, from the display apparatus, conversion characteristic information indicating a relationship between a pixel value of a display image based on a captured image input from the image capturing apparatus to the display apparatus and a display luminance value in a state in which the display image is displayed on the display apparatus, and an output unit configured to output, to the display apparatus together with the captured image, a corrected graphic image obtained by correcting a pixel value of the graphic image based on the conversion characteristic information and a target value of a display luminance value of the graphic image when the graphic image is displayed on the display apparatus.

According to another aspect of the embodiments, a display apparatus includes a display unit configured to display an image, an image obtaining unit configured to obtain a graphic image to be displayed on the display unit from an external apparatus, and an output unit configured to output, to the display unit, a corrected graphic image obtained by correcting a pixel value of the graphic image based on conversion characteristic information indicating a relationship between a pixel value of a display image input to the display unit and a display luminance value in a state in which the display image is displayed on the display unit and a target value of a display luminance value of the graphic image when the graphic image is displayed on the display unit.

According to yet another aspect of the embodiments, an image processing apparatus includes an image obtaining unit configured to obtain a graphic image to be displayed on a display unit, and an output unit configured to output, to the display unit, a corrected graphic image obtained by correcting a pixel value of the graphic image based on conversion characteristic information indicating a relationship between a pixel value of a display image input to the display unit and a display luminance value in a state in which the display image is displayed and a target value of a display luminance value of the graphic image when the graphic image is displayed.

Further features of the disclosure will become apparent from the following description of exemplary embodiments with reference to the attached drawings.

BRIEF DESCRIPTION OF THE DRAWINGS

FIG. 43 is a second diagram illustrating an example of a display range conversion characteristic.

FIG. 5A is a first diagram illustrating an example of a display range setting value.

FIG. 5B is a second diagram illustrating an example of a display range setting value.

FIG. 8 is a flowchart illustrating a processing flow in the display apparatus 200.

FIG. 17A is a first diagram illustrating a configuration of a display system 10 according to a fifth exemplary embodiment.

FIG. 17B is a first diagram illustrating a configuration of a display system 10 according to the fifth exemplary embodiment.

DESCRIPTION OF THE EMBODIMENTS

Figure 1:
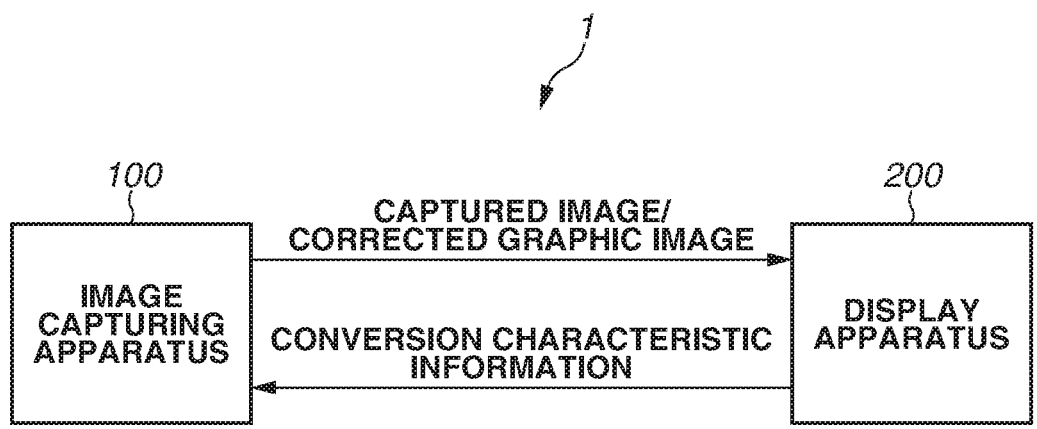
FIG. 1 illustrates a configuration of a display system 1 according to an exemplary embodiment.

FIG. 1 illustrates a configuration of a display system 1 according to a first exemplary embodiment. The display system 1 includes an image capturing apparatus 100 and a display apparatus 200. The image capturing apparatus 100 is a camera which captures a moving image or a still image and generates a captured image. The image capturing apparatus 100 is an exemplary embodiment of an image processing apparatus of the disclosure.

The display apparatus 200 can be connected to an external apparatus and is connected to the image capturing apparatus 100 by cable or wirelessly in an example illustrated in FIG. 1. The display apparatus 200 is a display which displays, for example, the captured image output from the image capturing apparatus 100. A communication method between the image capturing apparatus 100 and the display apparatus 200 is, for example, Serial Digital Interface (SDI), High-Definition Multimedia Interface (HDMI, registered trademark), wireless IEEE 802.11, Bluetooth (registered trademark), or wired IEEE 802.3.

A user who captures an image of an object using the image capturing apparatus 100 can display a captured image on the display apparatus 200 and capture an image while confirming a displayed image. The image capturing apparatus 100 transmits the captured image and a graphic image including an OSD image such as an operation menu to the display apparatus 200, and the display apparatus 200 displays the captured image and the graphic image superimposed thereon. The display apparatus 200 can switch a display range conversion characteristic for associating a pixel value of an input image with display luminance. A user switches the display range conversion characteristic and thus can change the display luminance of the captured image.

In this regard, when the display luminance of the graphic image is changed image due to switching of the display range conversion characteristic, visibility of the graphic image is lowered, and operability may be deteriorated in some cases. Thus, according to the display system 1, the image capturing apparatus 100 is notified of display range conversion characteristic information indicating the display range conversion characteristic set in the display apparatus 200. The display range conversion characteristic information is information indicating a relationship between a pixel value of a display image input to the display apparatus 200 and a display luminance value in a state when the display image is displayed on the display apparatus 200.

The image capturing apparatus 100 generates corrected graphic image data by correcting a pixel value of graphic image data so that the display luminance of the graphic image will be a target value (hereinbelow, referred to as target display luminance in some cases) based on the notified display range conversion characteristic information. The image capturing apparatus 100 transmits the corrected graphic image data to the display apparatus 200, and the graphic image is displayed at constant display luminance even when the display range conversion characteristic of the display apparatus 200 is changed, so that the visibility can be prevented from being lowered.

[Configuration of Image Capturing Apparatus 100]

Figure 2:
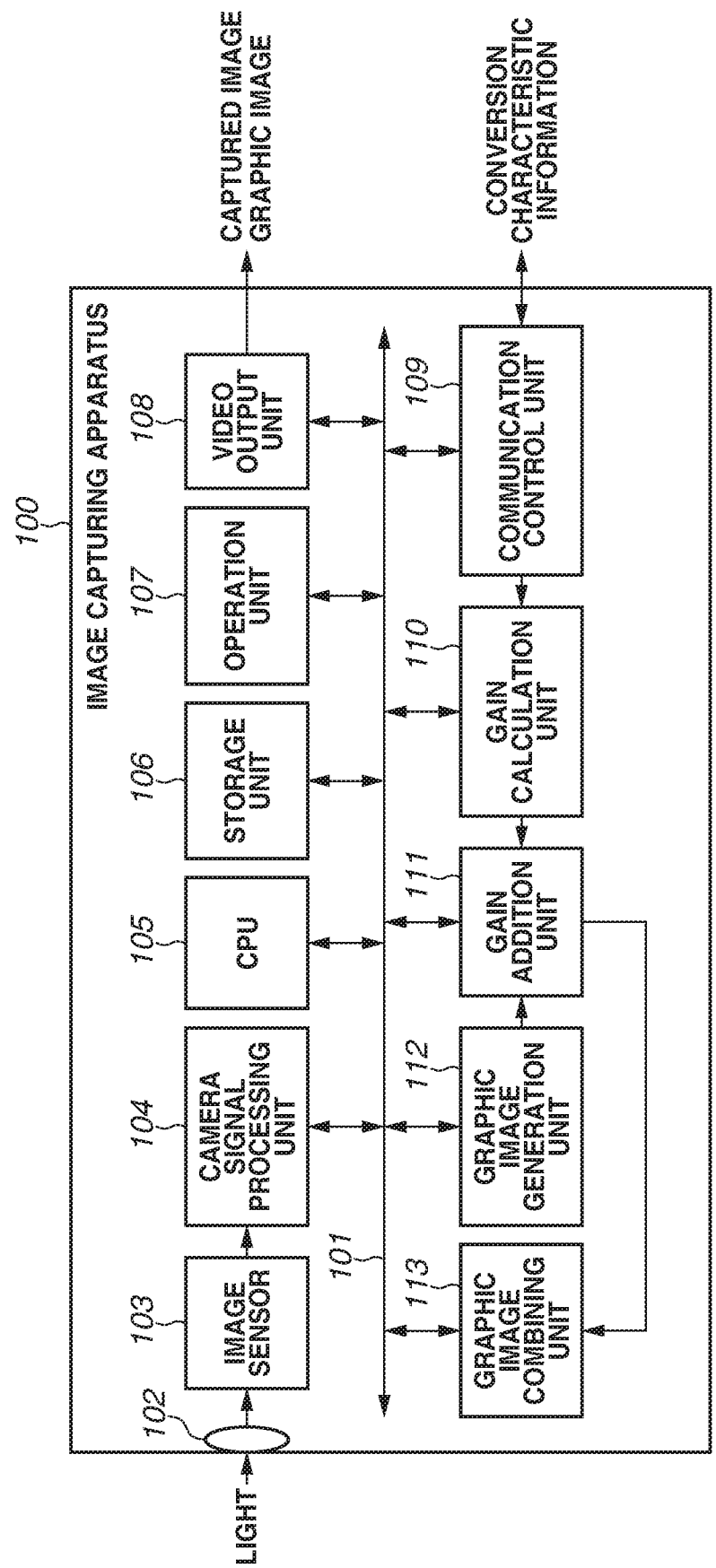
FIG. 2 illustrates a configuration of an image capturing apparatus 100.

FIG. 2 illustrates a configuration of the image capturing apparatus 100. The image capturing apparatus 100 includes an optical system 102, an image sensor 103, and a camera signal processing unit 104, a central processing unit (CPU) 105, a storage unit 106, an operation unit 107, a video output unit 108, a communication control unit 109, a gain calculation unit 110, a gain addition unit 111, a graphic image generation unit 112 and a graphic image combining unit 113 which are connected to an internal bus 101. Each unit connected to the internal bus 101 can exchange data with each other via the internal bus 101.

The optical system 102 includes an imaging lens which includes a focus and diaphragm mechanism and the like. The optical system 102 forms an optical image of an object.

The image sensor 103 includes, for example, a complementary metal oxide semiconductor (CMOS) element. The image sensor 103 includes an analog-to-digital converter which converts the optical image formed by the optical system 102 into an analog electric signal, further converts the analog electric signal into a digital signal, and generates a captured image data. The image sensor 103 inputs the captured image data generated by conversion to the camera signal processing unit 104.

The camera signal processing unit 104 performs various correction processing including predetermined pixel interpolation, resizing processing such as reduction, color conversion processing, and the like on the captured image data input from the image sensor 103. The CPU 105 controls each unit in the image capturing apparatus 100 by executing a program stored in the storage unit 106.

The storage unit 106 includes a read only memory (ROM) and a random access memory (RAM). The storage unit 106 stores the captured image data. Further, the storage unit 106 stores a program for controlling the CPU 105 and target display luminance when the graphic image is displayed on the display apparatus 200.

The operation unit 107 receives a user operation, generates a control signal corresponding to the operation, and notifies the CPU 105 of the control signal. For example, the operation unit 107 includes keyboard, a touch panel, or the like as an input device for receiving the user operation. The operation unit 107 receives, for example, an operation for outputting the graphic image to the display apparatus 200.

The video output unit 108 outputs a video signal including image data to be displayed on the display apparatus 200. The video output unit 108 outputs the captured image data and the graphic image data to the display apparatus 200 via an interface such as SDI, wireless IEEE 802.11, Bluetooth, or IEEE 802.3. The video output unit 108 outputs a video signal including the corrected graphic image data which is obtained by correcting the pixel value of the graphic image data based on the display range conversion characteristic information and the target display luminance to the display apparatus 200 in response to that the operation unit 107 receives an operation for outputting the graphic image to the display apparatus 200.

The communication control unit. 109 transmits and receives data to and from a communication control unit (a communication control unit 210 described below) included in the display apparatus 200 based on control of the CPU 105. The communication control unit 109 functions as an information obtaining unit for receiving the display range conversion characteristic information when the display range conversion characteristic is changed in the display apparatus 200. The display range conversion characteristic information includes a display range setting value set by a user. The display range setting value is a setting value for specifying the display luminance with respect to a pixel value of a display image input to the display apparatus 200. The communication control unit 109 notifies the gain calculation unit 110 of the received display range conversion characteristic information.

The gain calculation unit 110 calculates a gain value added to the graphic image using the display range setting value included in the display range conversion characteristic information notified from the communication control unit 109. A calculation method of the gain value is described below. The calculated gain value is output to the gain addition unit 111.

The gain addition unit 111 functions as an image obtaining unit for obtaining the graphic image generated by the graphic image generation unit 112 and generates a corrected graphic image by adding the gain value to the graphic image. The gain addition unit 111 adds the gain value, for example, by multiplying each pixel value of the graphic image by the gain value. Specifically, when each pixel is constituted of three image data pieces, namely red (R), green (G), and blue (B), the gain addition unit 111 multiplies each of R, G, and B pixel values by the gain value. The gain addition unit 111 outputs the gain-added corrected graphic image to the graphic image combining unit 113.

As described above, the gain calculation unit 110 and the gain addition unit 111 function as correction units for correcting the pixel value of the graphic image generated by the graphic image generation unit 112 and generating the corrected graphic image. The gain calculation unit 110 changes the gain value by calculating a new gain value in response to that the communication control unit 109 obtains the display range conversion characteristic information, and the gain addition unit 111 generates the corrected graphic image based on the changed gain value.

The graphic image generation unit 112 is an image generation unit for generating the graphic image to be combined with the captured image data output from, the camera signal processing unit 104 based on the control of the CPU 105. The graphic image generation unit 112 generates, for example, a waveform monitoring image indicating statistical values of luminance values and color distribution and a peaking monitoring image for emphasizing an edge area included in the captured image. The graphic image generation unit 112 may read and use the graphic image stored in advance in the storage unit 106.

The graphic image combining unit 113 combines the captured image data output from, the camera signal processing unit 104 with the corrected graphic image data based on the control of the CPU 105. The graphic image combining unit 113 output the combined image data to the video output unit 108.

Figure 3:
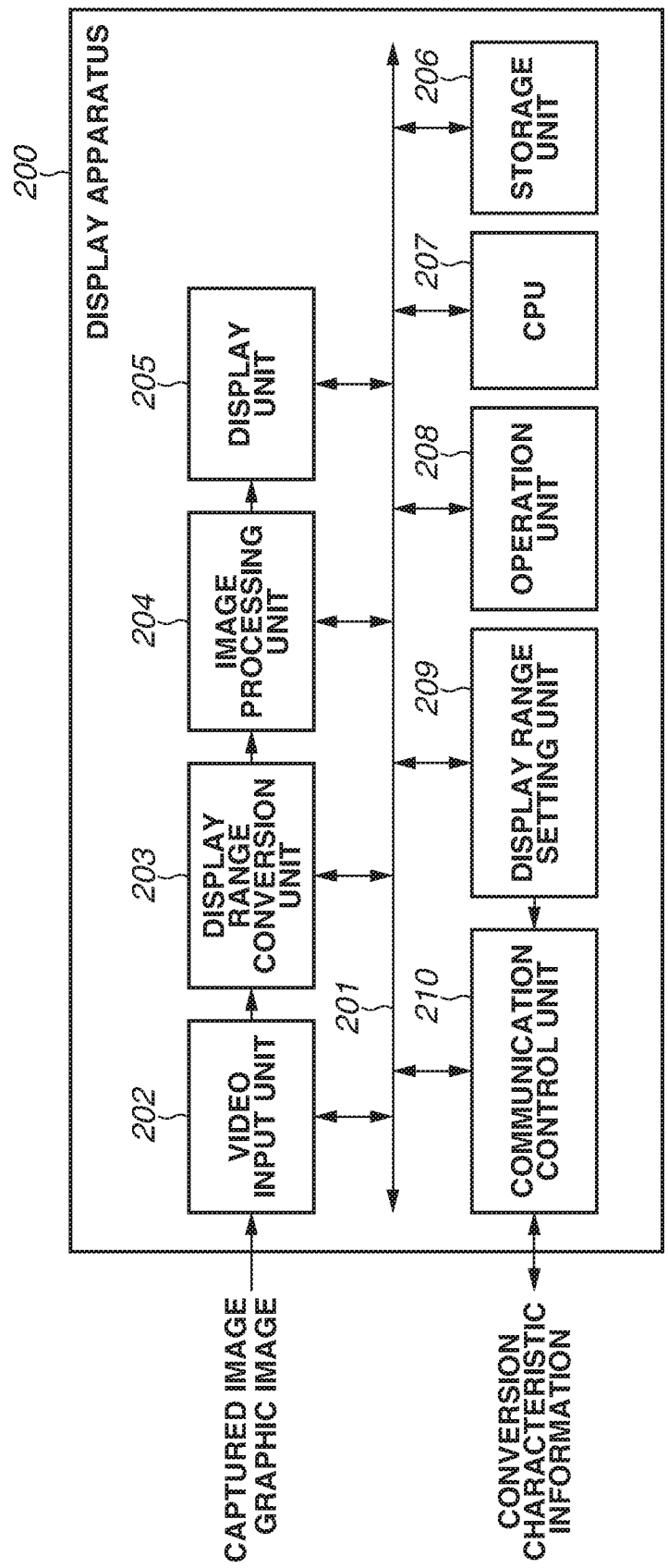
FIG. 3 illustrates a configuration of a display apparatus 200.

FIG. 3 illustrates a configuration of the display apparatus 200. The display apparatus 200 includes a video input unit 202, a display range conversion unit 203, an image processing unit 204, a display unit 205, a storage unit 206, a CPU 207, an operation unit 208, a display range setting unit 209, and the communication control unit 210 which are connected to an internal bus 201. Each unit connected to the internal bus 201 can exchange data with each other via the internal bus 201.

The video input unit 202 obtains the captured image data and the graphic image data output from the video output unit 108 based on control of the CPU 207. The video output unit 108 obtains the captured image data and the graphic image data via an interface such as SDI, wireless IEEE 802.11, Bluetooth, or IEEE 802.3.

The display range conversion unit 203 converts the captured image data and the graphic image data obtained by the video input unit 202 into display data for a display panel based on the display range conversion characteristic information. The display range conversion characteristic information is information indicating the relationship between the pixel value of the display image input to the display apparatus 200 and the display luminance value in a state when the display image is displayed on the display unit 205 of the display apparatus 200 and stored, for example, in the storage unit 206. The display range conversion characteristic information is described in detail below. The display range conversion unit 203 outputs the display data which is obtained by converting the captured image data and the graphic image data based on the display range conversion characteristic information to the image processing unit 204.

The image processing unit 204 performs image processing such as enlargement, reduction, and backlight control on the display data input from the display range conversion unit 203. The image processing unit 204 outputs the display data subjected to the image processing to the display unit 205.

The display unit 205 is a display which displays the display data subjected to the image processing input from the image processing unit 204.

The storage unit 206 includes a ROM and a RAM. The storage unit 206 temporarily stores the captured image data and the graphic image data obtained by the video input unit 202. The storage unit 206 also stores a program for controlling the CPU 207. The storage unit 206 further stores the display range conversion characteristic information. The storage unit 206 stores, for example, a first conversion characteristic for converting the pixel value of the display image into a different display luminance value (a conversion characteristic of a normalizing method described below) and a second conversion characteristic for converting the pixel value of the display image which is greater than or equal to a predetermined upper limit pixel value into the upper limit pixel value (a conversion characteristic of a limiting method described below) as the display range conversion characteristic information pieces.

The CPU 207 controls each unit in the display apparatus 200.

The operation unit 208 receives a user operation, generates a control signal corresponding to the operation, and notifies the CPU 207 of the control signal. The operation unit 208 includes a keyboard, a touch panel, or the like as an input device for receiving the user operation. The operation unit 208 functions as a setting reception unit for receiving, for example, a type of the display range conversion characteristic information used by a user and a setting of the display range setting value.

The display range setting unit 209 sets the display range setting value included in the display range conversion characteristic information based on an operation performed by a user using the operation unit 208. The display range setting unit 209 updates the display range setting value stored in the storage unit 206 with the setting value input by the user using the operation unit 208 to reset the display range setting value. The display range setting unit 209 outputs the display range conversion characteristic information including the set display range setting value to the communication control unit 210. The display apparatus 200 according to the present exemplary embodiment corresponds to a plurality of types of the display range conversion characteristic information pieces, and the display range setting unit 209 can set which of the display range conversion characteristic information pieces is used based on a user operation.

The communication control unit 210 transmits and receives data to and from the communication control unit 109. The communication control unit 210 transmits, in response to that the display range setting unit 209 updates the display range setting value with a setting value input by the user, the updated display range setting value to the communication control unit 109.

The display range conversion characteristic is described.

Figure 4A:
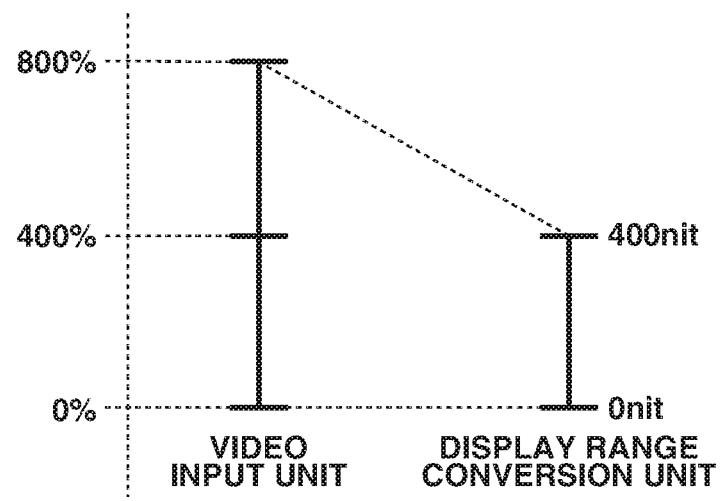
FIG. 4A is a first diagram illustrating an example of a display range conversion characteristic.
Figure 4B:
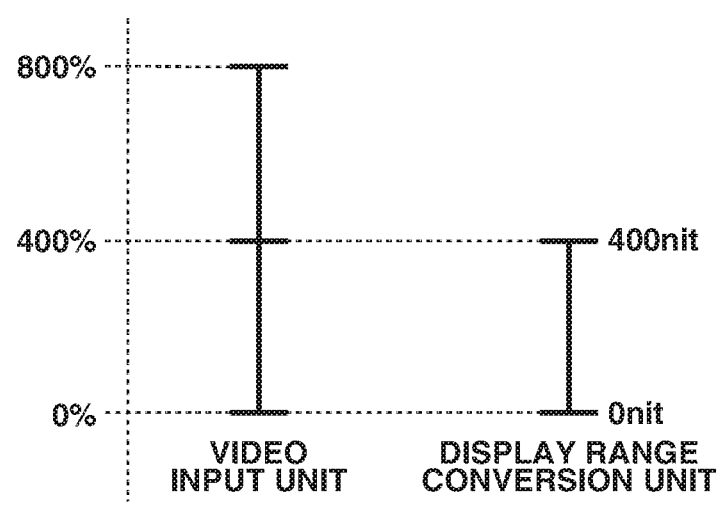

FIGS. 4A and 4B illustrate examples of the display range conversion characteristics. FIG. 4A illustrates a first type of the display range conversion characteristic, and FIG. 4B illustrates a second type of the display range conversion characteristic. Ordinates in FIGS. 4A and 4B represent a video signal level and the display luminance value. The video signal level corresponds to a pixel value which is obtained by converting RAW data of the captured image data generated by the image capturing apparatus 100 into LOG data having a predetermined bit number (for example, 8 bits).

The LOG data is data obtained by converting the RAW data based on a LOG curve indicating a relationship between an exposure amount and the video signal level, and a unit of the video signal level is percentage (%). As the value of the video signal level is larger, the image is brighter, and as the value of the video signal level is smaller, the image is darker. According to the present exemplary embodiment, the video signal level of the captured image data output by the image capturing apparatus 100 is in a gradation range from 0% to 800%.

FIG. 4A illustrates the display range conversion characteristic in a normalizing method in which the display range conversion unit 203 generates the display data by compressing gradation in the entire gradation range of the image data obtained by the video input unit 202. In FIG. 4A, a maximum value of the video signal level of the image data obtained by the video input unit 202 is 800%, and a maximum value of the display luminance of the display data to be generated by the display range conversion unit 203 is 400 nit. The display range conversion unit 203 compresses the gradation so that the display luminance value which is a luminance value when the image data in the video signal level in the gradation from 0% to 800% is displayed on the display unit 205 falls within 400 nit.

FIG. 4B illustrates the display range conversion characteristic in a limiting method in which the display range conversion unit 203 converts the video signal level in a range greater than or equal to a predetermined threshold value in the gradation range of the image data obtained by the video input unit 202 into the threshold value. In the case that the limiting method is selected, the display range conversion unit 203 sets the display luminance value when the image data in the video signal level in the gradation from 0% to 400% is displayed to 0 nit to 400 nit. Further, the display range conversion unit 203 sets the display luminance value when the image data in the video signal level in the gradation from 400% to 800% is displayed to 400 nit.

The display range conversion characteristics illustrated in FIGS. 4A and 4B are expressed by the display range setting value. The display range setting value is information indicating a type of the display range conversion characteristic and a relationship between the video signal level and the display luminance value.

FIGS. 5A and 5B illustrate examples of the display range setting values. FIG. 5A illustrates a relationship between a signal reference value and the display luminance in the normalizing method when a setting value of a conversion characteristic type is "1". The signal reference value corresponds to a value of the video signal level included in the display range setting value. Regarding the display range conversion characteristic in the normalizing method, all of the video signal levels are respectively assigned to different display luminance.

FIG. 5B illustrates a relationship between a signal reference value and the display luminance the limiting method when the setting value of the conversion characteristic type is "2". Regarding the display range conversion characteristic in the limiting method, the video signal levels greater than or equal to 400% are assigned to the display luminance of 400 nit. Every time the display range setting values illustrated in FIGS. 5A and 5B are updated, the display apparatus 200 transmits the display range conversion characteristic information including the updated display range setting value to the image capturing apparatus 100.

The image capturing apparatus 100 outputs the corrected graphic image data corrected by the gain value which is different according to the conversion characteristic type indicated by the received display range conversion characteristic information from the video output unit 108. Specifically, when the display range conversion characteristic information indicates the characteristic (the first conversion characteristic) of the normalizing method for converting the pixel value of the display image into a different display luminance value, the video output unit 108 outputs the corrected graphic image obtained by correcting the pixel value of the graphic image data generated by the graphic image generation unit 112. In addition, when the display range conversion characteristic information indicates the characteristic (the second conversion characteristic) of the limiting method for converting the pixel value of the display image having the predetermined upper limit pixel value or greater into the upper limit pixel value, the video output unit 108 outputs the graphic image generated by the graphic image generation unit 112 as the corrected graphic image.

[Processing Sequence between Image Capturing Apparatus 100 and Display Apparatus 200]

Figure 6:
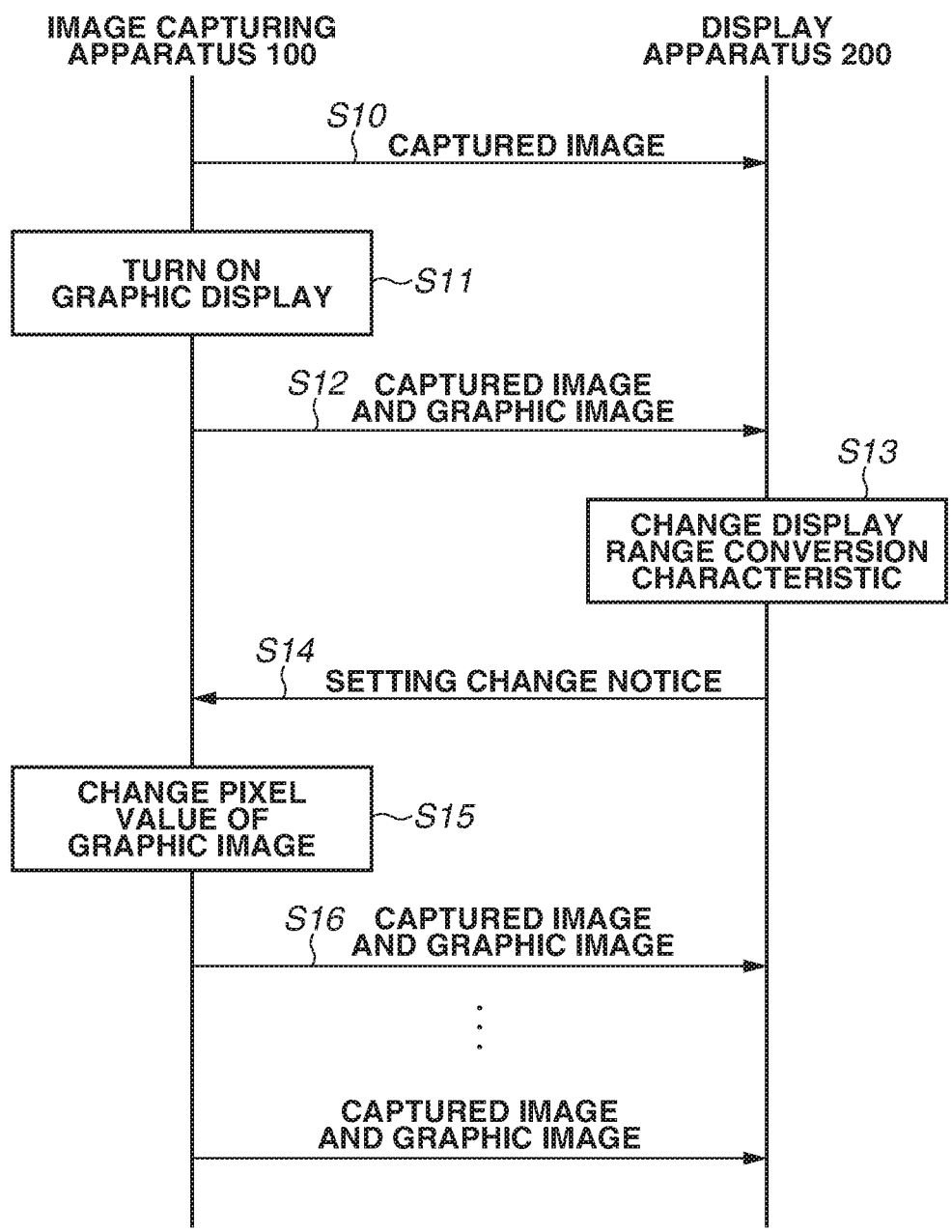
FIG. 6 illustrates a processing sequence performed between the image capturing apparatus 100 and the display apparatus 200.

FIG. 6 illustrates a processing sequence performed between the image capturing apparatus 100 and the display apparatus 200. A flow of processing performed between the image capturing apparatus 100 and the display apparatus 200 is described below with reference to FIG. 6.

First, in step S10, a user connects the image capturing apparatus 100 to the display apparatus 200 and switches to a live view output mode for outputting a video captured by the image capturing apparatus 100 in real time to the display apparatus 200, the image capturing apparatus 100 starts to output the captured image data to the display apparatus 200.

In response to that the user executes in step S11 an operation for turning on the display of the graphic image, step S12, the image capturing apparatus 100 outputs the captured image data based on the captured video and the graphic image data to the display apparatus 200. The image capturing apparatus 100 may output combined image data obtained by combining the captured image and the graphic image to the display apparatus 200. The display apparatus 200 displays the input captured image data and graphic image data on the display unit 205.

Subsequently, in step S13, when the user changes the display range conversion characteristic of the display apparatus 200, in step S14, the display apparatus 200 transmits a setting change notice indicating that the display range conversion characteristic is changed to the image capturing apparatus 100. The setting change notice includes, for example, the display range setting value corresponding to the changed display range conversion characteristic.

Subsequently, in the image capturing apparatus 100, the gain calculation unit 110 calculates the gain to be added to the graphic image based on the changed display range setting value notified by the setting change notice. In step S15, the gain addition unit 111 adds the calculated gain to the graphic image generated by the graphic image generation unit 112 and thus changes the pixel value of the graphic image data. In step S16, the image capturing apparatus 100 transmits the graphic image data of which the pixel value is changed together with the captured image data to the display apparatus 200. While there is no change in the display range conversion characteristic, the image capturing apparatus 100 continues to output the graphic image data of which the pixel value is determined using the gain calculated based on the display range setting value updated last together with the captured image data to the display apparatus 200.

[Flowchart of Processing in Image Capturing Apparatus 100]

Figure 7:
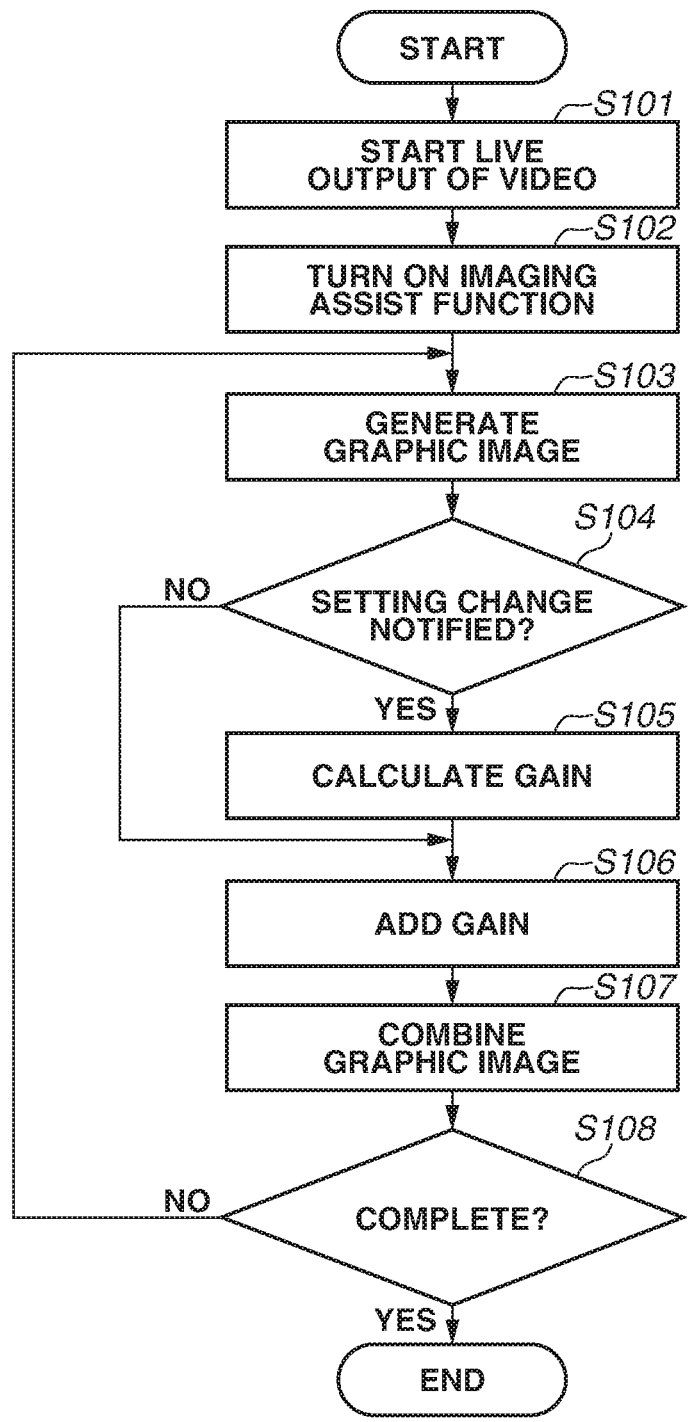
FIG. 7 is a flowchart illustrating a processing flow for adding a gain to a graphic image in the image capturing apparatus 100.

FIG. 7 is a flowchart illustrating a processing flow for adding the gain to the graphic image in the image capturing apparatus 100.

In step S101, when the live view output mode is set, the image capturing apparatus 100 starts live output of a video by transmitting the captured image data based on the captured video to the display apparatus 200. Subsequently, when an imaging assist function is enabled in step S102 by the user operation, in step S103, the graphic image generation unit 112 generates a menu image constituted of the graphic image.

The menu image includes a menu for setting various settings, for example, a peaking display setting for superimposing and displaying a peaking image for emphasizing an edge of an object image in the captured image, a pixel zoom display setting for enlarging and displaying the captured image, and a zebra display setting for displaying an area in a predetermined luminance level in stripes. The menu image may include include arbitrary contents and may include a menu for performing basic settings of a camera function of the image capturing apparatus 100.

Subsequently, in step S104, the CPU 105 confirms whether a change notice of the display range setting value is received from the display apparatus 200. When the change notice of the display range setting value is received (YES in step S104), the CPU 105 advances the processing to step S105 and causes the gain calculation unit 110 to calculate the gain value based on the changed display range setting value. In step S106, the gain addition unit 111 adds the gain by multiplying the pixel value of the graphic image generated in step S103 by the calculated gain value. In step S104, when it is determined that the change notice of the display range setting value is not received (NO in step S104), in step S106, the CPU 105 adds the gain to the graphic image based on the gain value calculated in the past.

Subsequently, in step S107, the CPU 105 causes the graphic image combining unit 113 to combine the gain-added graphic image with the captured image output by the camera signal processing unit 104. The CPU 105 repeats the processing from step S103 to step S107 until a function of displaying the graphic image is terminated (NO in step S108). When the function of displaying the graphic image is terminated by the user operation (YES in step S108), the CPU 105 terminates the processing for adding the gain to the graphic image.

The captured image data output from the image capturing apparatus 100 is not limited to the captured image data based on the live view video and may be the captured image data stored in the image capturing apparatus 100.

FIG. 8 is a flowchart illustrating a processing flow in the display apparatus 200.

In step S201, when the video signal including the image data is input to the video input unit 202 based on the control of the CPU 207, the display apparatus 200 outputs the image data included in the input video signal to the display range conversion unit 203.

Subsequently, in step S202, the display range conversion unit 203 performs display range conversion on the pixel value of the image data based on the display range conversion characteristic information and thus generates the display data. In step S203, after the image processing unit 204 performs enlargement and reduction processing and the image processing according to a device characteristic of the display unit 205 on the display data, the display unit 205 displays the display data subjected to the image processing.

In step S204, the CPU 207 monitors whether the user changes the display range conversion characteristic via the operation unit 208 while the display unit 205 displays the display data. When detecting that the display range conversion characteristic is changed (YES in step S204), the CPU 207 causes the display range setting unit 209 to change the display range setting value. In step S205, the CPU 207 instructs the communication control unit 210 to transmit the setting change notice including the changed display range conversion characteristic information to the image capturing apparatus 100. When it is not detected that the display range conversion characteristic is changed (NO in step S204), the CPU 207 advances the processing to step S206.

The CPU 207 repeats the processing from step S202 to step S205 until the user performs an operation for terminating the operation for displaying the image data input from the image capturing apparatus 100 (NO in step S206). When the user performs the operation for terminating the operation for displaying the image data input from the image capturing apparatus 100 (YES in step S206), the CPU 207 terminates the processing.

A method is described in which the gain calculation unit 110 in the image capturing apparatus 100 calculates the gain value. A case is described here as an example in which the graphic image generation unit 112 generates a graphic image in the video signal level of 100%, and a target value of the display luminance when the display apparatus 200 displays the graphic image is 100 nit.

First, a method is described in which the gain calculation unit 110 calculates the gain value when the conversion characteristic type is the normalizing method. The gain calculation unit 110 calculates the gain value based on the display range conversion characteristic information of the normalizing method illustrated in FIGS. 4A and 5A and the target display luminance of the graphic image. Specifically, the gain calculation unit 110 calculates the gain value based on a ratio of the pixel value of the graphic image specified based on the display range conversion characteristic information to the display luminance value in a state that the graphic image is displayed on the display unit and the target display luminance.

More specifically, the gain calculation unit 110 calculates the gain value by a following formula. Gain value=target display luminance/(100 nit*display luminance of signal reference value/signal reference value)

The signal reference value in the above-described formula is any of the video signal level values indicated in FIG. 5A. The display luminance of the signal reference value is the display luminance corresponding to the signal reference value selected from among the display luminance indicated in FIG. 5A. In the case of the example in FIG. 5A, the gain calculation unit 110 can select an arbitrary signal reference value. For example, when the signal reference value is 800%, and the display luminance corresponding to the signal reference value of 800% is 400 nit, the gain calculation unit 110 calculates the gain value as 2.0 based on a following formula.

Gain value=100/(100*400/800)=2.0

When a relationship between the signal reference value and the display luminance is different depending on the signal reference value, the gain calculation unit 110 may calculate the gain value based on a relationship between a signal reference value corresponding to the display luminance closest to the target display luminance and the display luminance of the relevant signal reference value. For example, when the target display luminance is 100 nit, the gain calculation unit 110 may select 200% as the signal reference value and calculate the gain value as 2.0 since the display luminance corresponding to the signal reference value of 200% is 200 nit.

When the gain value is 2.0, and the video signal level of the graphic image is 100%, the gain addition unit 111 multiplies the pixel value of the graphic image by 2.0 and generates the corrected graphic image data of which the video signal level is 200%. The graphic image combining unit 113 combines the generated corrected graphic image data with the captured image data, and the video output unit 108 outputs the combined image data to the display apparatus 200.

Figure 9A:
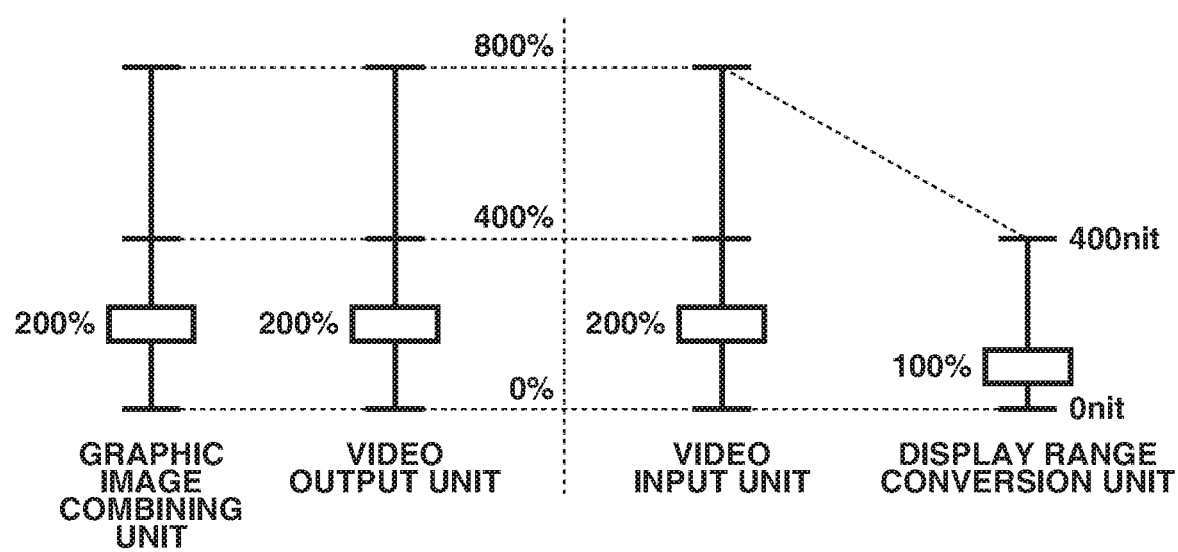
FIG. 9A is a first diagram illustrating a relationship between a video signal level and display luminance of corrected graphic image data.
Figure 9B:
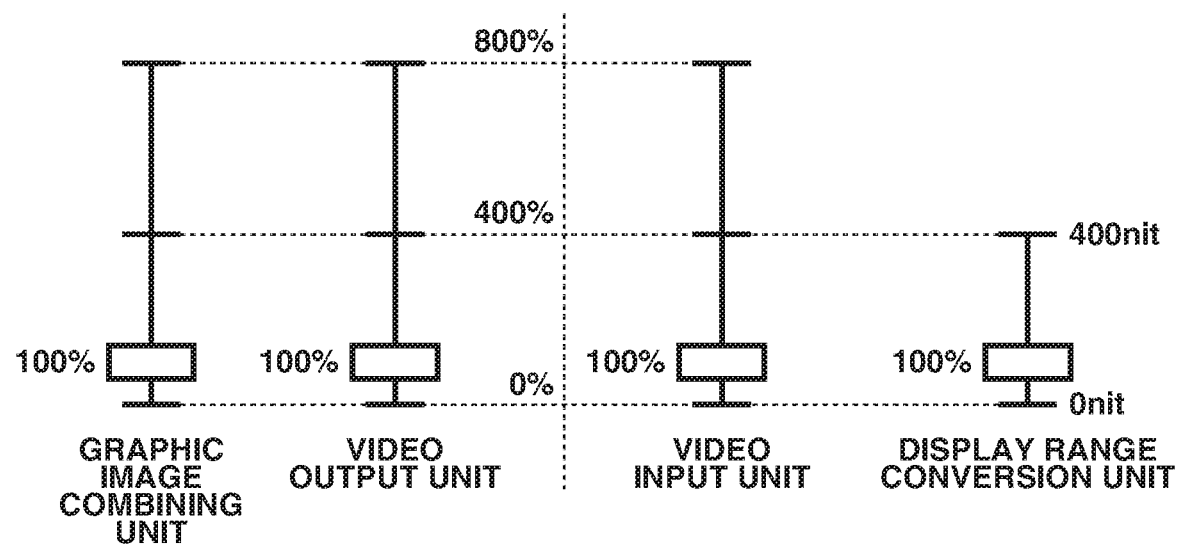
FIG. 9B is a second diagram illustrating a relationship between a video signal level and display luminance of corrected graphic image data.

FIGS. 9A and 9B illustrate relationships between the video signal levels of the corrected graphic image data and the display luminance. FIG. 9A illustrates a case when the conversion characteristic type is the normalizing method, and FIG. 9B illustrates a case when the conversion characteristic type is the limiting method.

As illustrated in FIG. 9A, when the conversion characteristic type is the normalizing method, the corrected graphic image data of which the video signal level is 200% is generated since the gain value is 2.0. Further, the corrected graphic image data of which the video signal level is 200% is output from the video output unit 108 to the video input unit 202. The corrected graphic image data input to the video input unit 202 is converted by the display range conversion unit 203 into the display data corresponding to the display luminance of 100 nit based on the display range conversion characteristic information. Accordingly, the display apparatus 200 can display the graphic image of 100 nit which is equivalent to the target display luminance.

Next, a method is described in which the gain calculation unit 110 calculates the gain value when the conversion characteristic type is the limiting method. The gain calculation unit 110 calculates the gain value by a following formula based on the display range conversion characteristic information of the limiting method illustrated in. FIGS. 4B and 5B and the target display luminance.

Gain value=target display luminance/100 nit

When the target display luminance is 100 nit, the gain value is 1.0. The gain addition unit 111 multiplies the pixel value of the graphic image by the gain value similar to the case when the conversion characteristic type is the normalizing method and thus generates the corrected graphic image data of which the video signal level 100%.

As illustrated in FIG. 9B, when the conversion characteristic type is the limiting method, the corrected graphic image data of which the video signal level is 100% is generated since the gain value is 1.0. Further, the corrected graphic image data of which the video signal level is 100% is output from the video output unit 108 to the video input unit 202. Since the video signal level does not exceed 400% as a limit value, the corrected graphic image data input to the video input unit 202 is converted by the display range conversion unit 203 into the display data corresponding to the display luminance of 100 nit. Accordingly, the display apparatus 200 can display the graphic image of 100 nit which is equivalent to the target display luminance when the conversion characteristic type is the limiting method.

As described above, in the display system 1, when the display range conversion characteristic is changed in the display apparatus 200, the image capturing apparatus 100 is notified of the display range setting value indicating the changed display range conversion characteristic. Further, the image capturing apparatus 100 generates the corrected graphic image by correcting the pixel value of the graphic image based on the display range setting value and the target value of the display luminance of the graphic image and outputs the corrected graphic image in the video signal level corresponding to the corrected pixel value to the display apparatus 200. Accordingly, when the display range conversion characteristic is changed in the display apparatus 200, the display apparatus 200 can display the graphic image of which the display luminance is equivalent to the target display luminance.

In this regard, the image capturing apparatus 100 does not change the video signal level of the captured image data based on the captured video even if the display range conversion characteristic is changed. Therefore, in the display apparatus 200, the display luminance of the captured image data is appropriately controlled based on the display range conversion characteristic according to the brightness of the captured video, and the display luminance of the graphic image is maintained in a constant value, so that lowering of the visibility due to variation of the display luminance of the graphic image can be suppressed.

According to the first exemplary embodiment, the image capturing apparatus 100 stores the target display luminance in the storage unit 106, however, a second exemplary embodiment is different from the first exemplary embodiment in that a user can set a target display luminance in a display apparatus.

Figure 10:
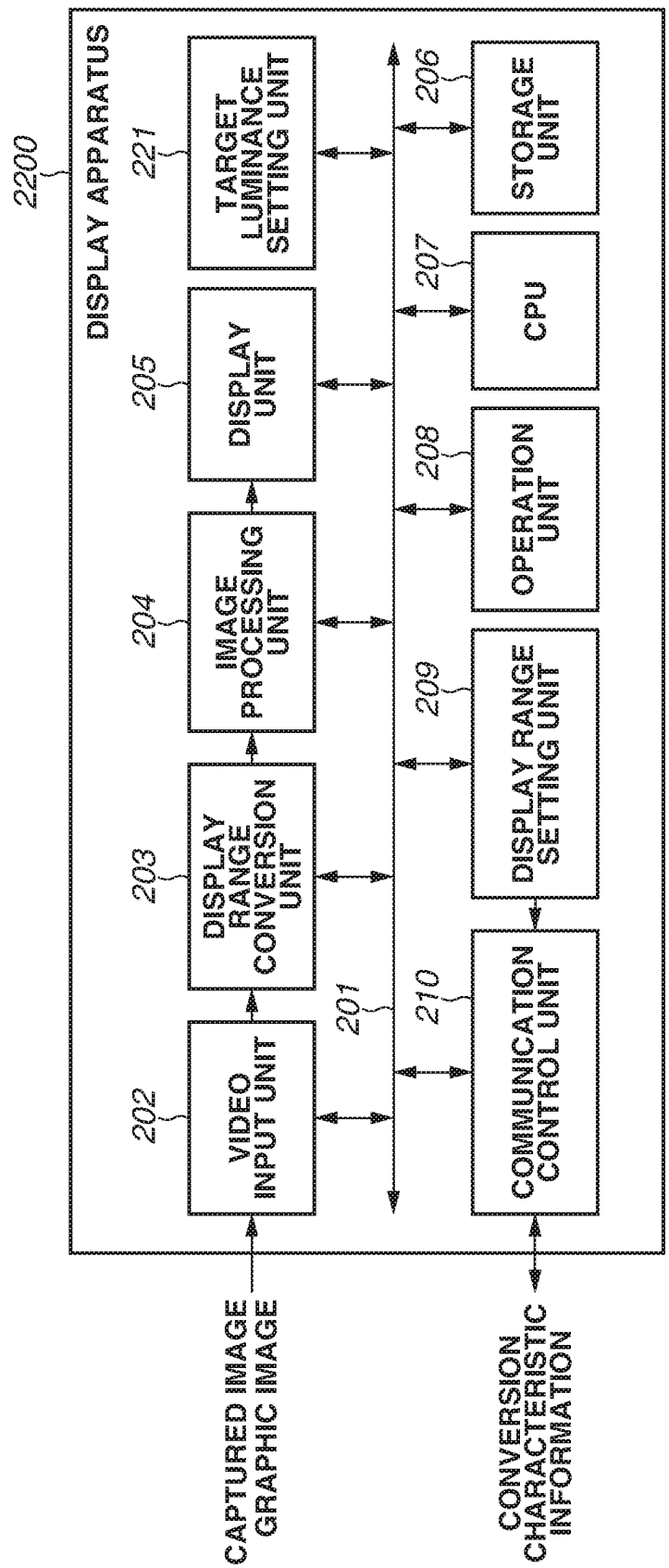
FIG. 10 illustrates a configuration of a display apparatus 2200 according to a second exemplary embodiment.

FIG. 10 illustrates a configuration of a display apparatus 2200 according to the second exemplary embodiment. The display apparatus 2200 is different from the display apparatus 200 illustrated in FIG. 3 in that a target luminance setting unit 221 is further included therein, and other than that are the same. The target luminance setting unit 221 sets a target value input by a user via the operation unit 208 to the target display luminance. The target luminance setting unit 221 notifies the image capturing apparatus 100 of the set target display luminance via the communication control unit 210.

Figure 11:
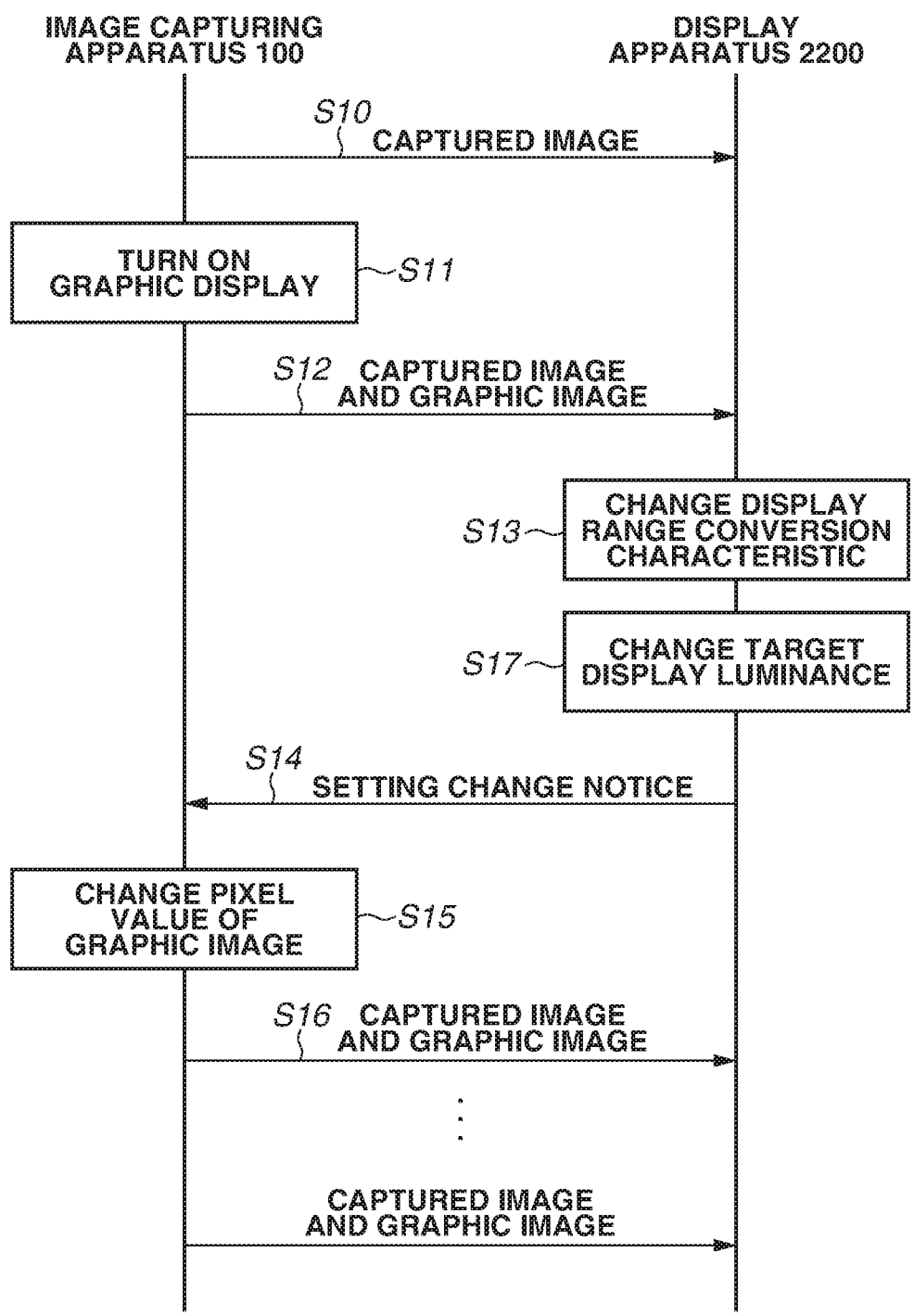
FIG. 11 illustrates processing sequence performed between the image capturing apparatus 100 and the display apparatus 2200 according to the second exemplary embodiment.

FIG. 11 illustrates a processing sequence performed between the image capturing apparatus 100 and the display apparatus 2200 according to the second exemplary embodiment. The processing sequence illustrated in FIG. 11 is different in that step S17 for changing the target display luminance is included after step S13. When the target display luminance is changed, the display apparatus 2200 transmits a setting change notice including the display range conversion characteristic information and the target display luminance to the image capturing apparatus 100. When only either one of the display range conversion characteristic and the target display luminance is changed, the display apparatus 2200 may transmit the setting change notice including only either one of the changed display range conversion characteristic information and the changed target display luminance.

In the image capturing apparatus 100, the communication control unit 109 stores the received display range conversion characteristic information and target display luminance in the storage unit 106. The gain calculation unit 110 calculates the gain value based on the display range setting value and the target display luminance included in the received display range conversion characteristic information, and the gain addition unit 111 generates the corrected graphic image data.

For example, when the target display luminance is changed from 100 nit in the first exemplary embodiment to 200 nit, the gain calculation unit 110 calculates a new gain value in response to receiving the setting change notice including the target display luminance. When the conversion characteristic type is the normalizing method, the target display luminance 200 nit, the signal reference value is 800%, and the display luminance corresponding to the signal reference value of 800% is 400 nit, the gain value is 4.0.

$$\text{Gain value} = 200/(100*400/800) = 4.0$$

In this case, the image capturing apparatus 100 transmits the corrected graphic image data of which the video signal level is 400% to the display apparatus 2200. In the display range conversion characteristic information illustrated in FIG. 5A, the display luminance is 200 nit when the video signal level is 400%, so that the display apparatus 2200 can display the graphic image in the changed target display luminance of 200 nit.

Figure 12:
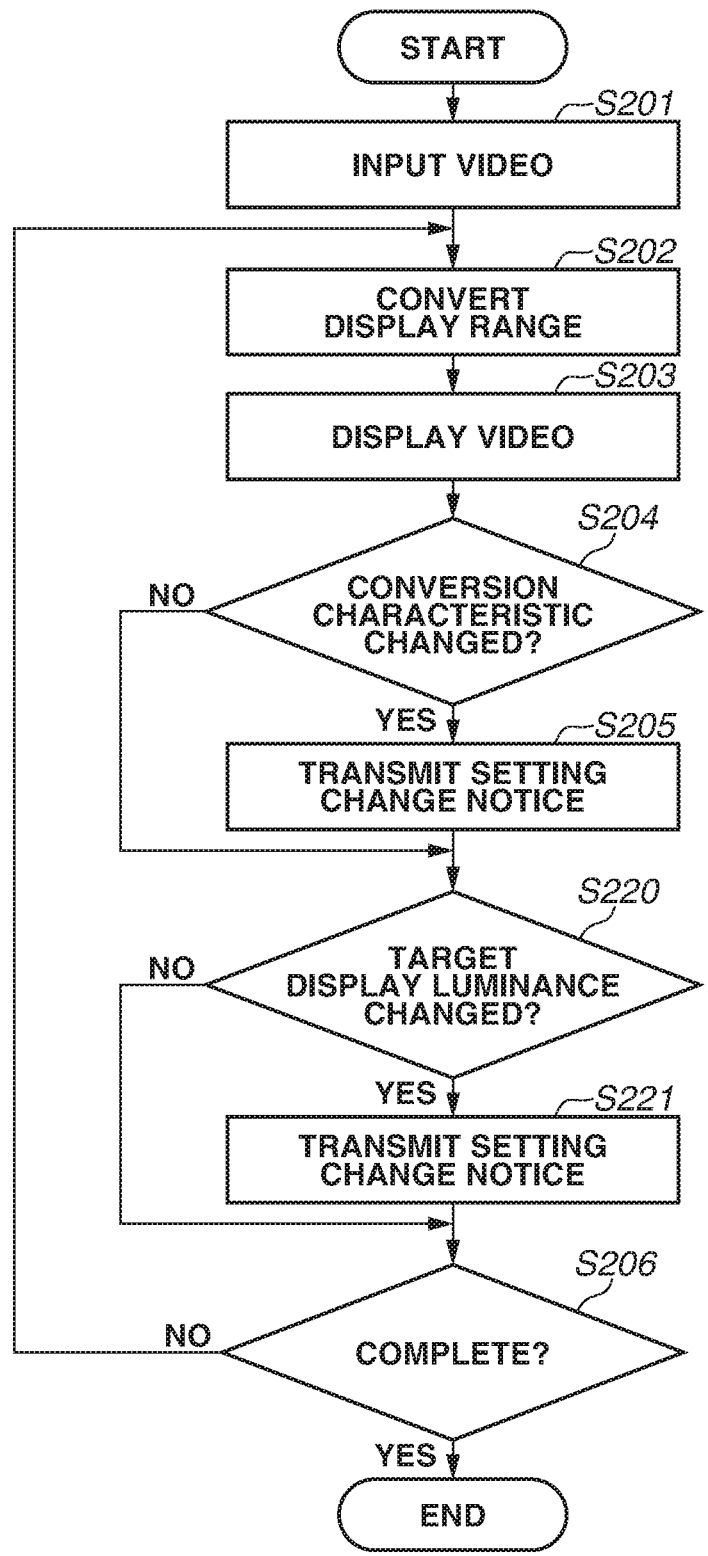
FIG. 12 is a flowchart illustrating processing of the display apparatus 2200 according to the second exemplary embodiment.

FIG. 12 is a flowchart illustrating processing of the display apparatus 2200 according to the second exemplary embodiment. The flowchart illustrated in FIG. 12 is different from that illustrated in FIG. 8 in that steps S220 and S221 are included between steps S205 and S206.

In step S220, the CPU 207 monitors whether an operation for changing the target display luminance is performed. When detecting that the target display luminance is changed (YES in step S220), the CPU 207 causes the target luminance setting unit 221 to update the target display luminance. Then, in step S221, the CPU 207 transmits the setting change notice including the updated target display luminance to the image capturing apparatus 100 via the communication control unit 210. The CPU 207 can execute the processing in steps S204 and S205 and in steps S220 and S221 illustrated in FIG. 12 in an arbitrary order.

As described above, in the display system 1 according to the second exemplary embodiment, when a user sets the target display luminance of the graphic image in the display apparatus 2200, the display apparatus 2200 notifies the image capturing apparatus 100 of the changed target display luminance. The image capturing apparatus 100 generates the corrected graphic image data in the video signal level based on the gain value calculated based on the changed target display luminance and outputs the corrected graphic image data to the display apparatus 2200. Accordingly, after a user changes the target display luminance of the graphic image to a desired magnitude, the display apparatus 200 can display the graphic image in the changed target display luminance regardless of the set display range conversion characteristic.

In the above exemplary embodiment, the example is described in which a user changes the target display luminance in the display apparatus 2200, it may be configured to enable a user to change the target display luminance in the image capturing apparatus 100. In this case, the image capturing apparatus 100 updates the target display luminance stored in the storage unit 106 and calculates the gain value based on the updated target display luminance.

According to the first and the second exemplary embodiments, the image capturing apparatus 100 generates the corrected graphic image data based on the display range conversion characteristic information and the target display luminance and outputs the image data obtained by combining the captured image data and the corrected graphic image data to the display apparatus. In contrast, a third exemplary embodiment is different from the first and the second exemplary embodiments in that a display apparatus corrects a luminance value of graphic image input from an image capturing apparatus.

Figure 13:
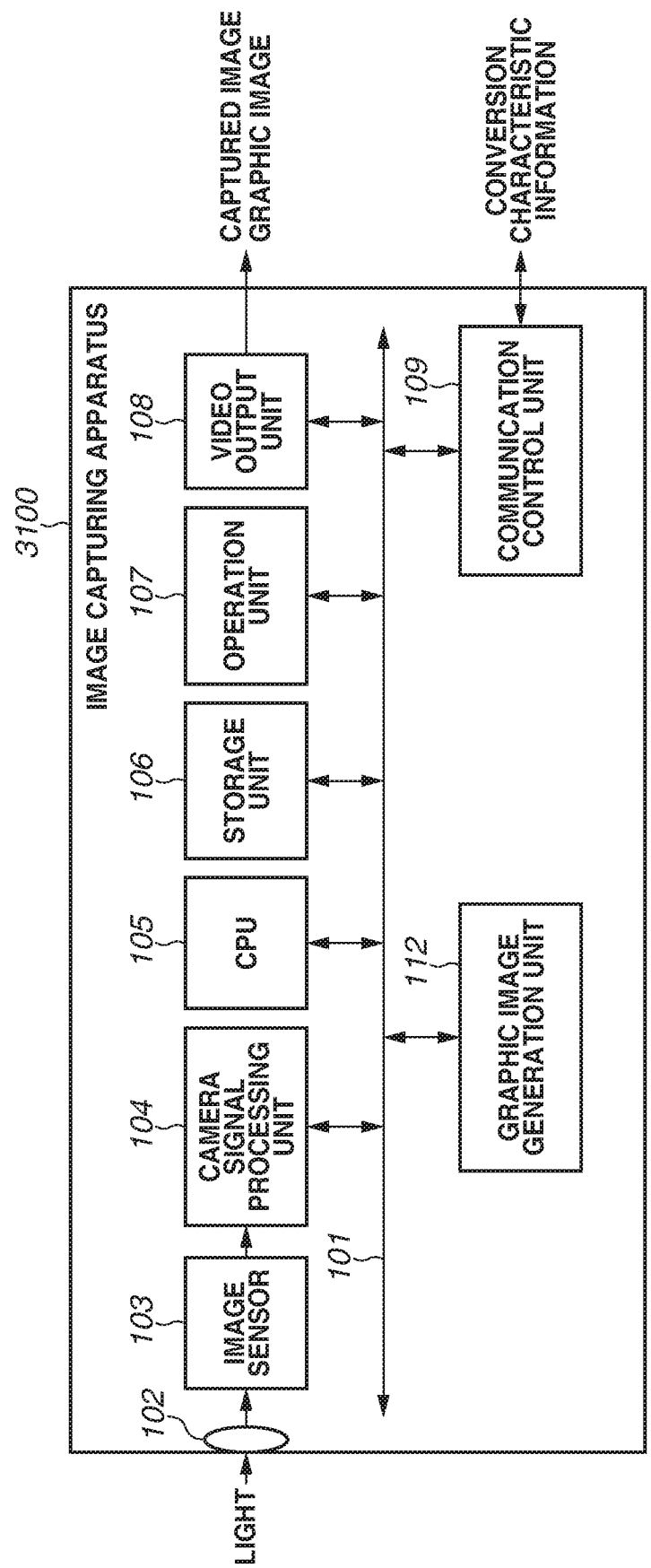
FIG. 13 illustrates a configuration of an image capturing apparatus 3100 according to a third exemplary embodiment.
Figure 14:
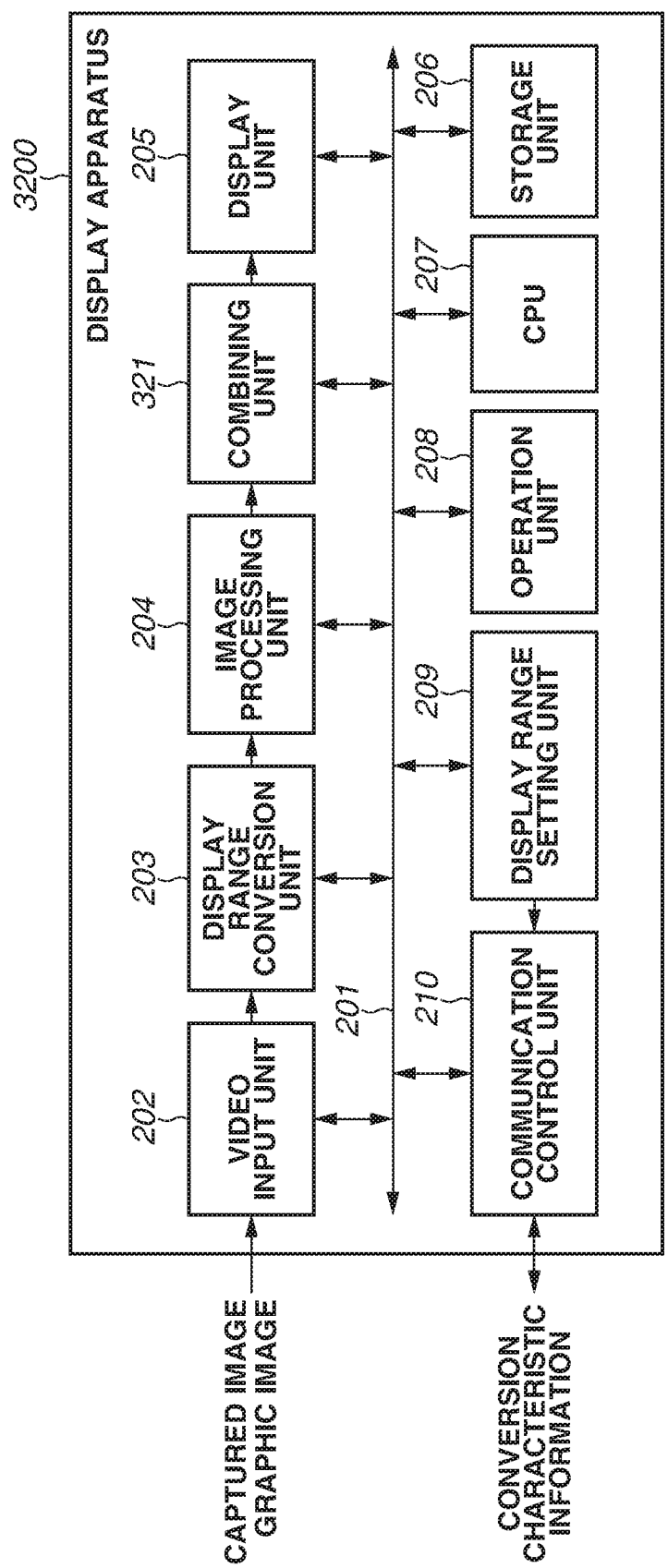
FIG. 14 illustrates a configuration of a display apparatus 3200 according to the third exemplary embodiment.

FIG. 13 illustrates a configuration of an image capturing apparatus 3100 according to the third exemplary embodiment. FIG. 14 illustrates a configuration of a display apparatus 3200 according to the third exemplary embodiment.

The image capturing apparatus 3100 illustrated in FIG. 13 is different from the image capturing apparatus 100 illustrated in FIG. 2 in that the gain calculation unit 110 and the gain addition unit 111 are not included therein. The graphic image generation unit 112 generates graphic image data based on an instruction from the CPU 105. The graphic image generation unit 112 writes the generated graphic image data in the storage unit 106.

The communication control unit 109 reads the graphic image data stored in the storage unit 106 and transmits the read graphic image data to the communication control unit 210. Further, the communication control unit 109 transmits attribute information indicating an attribute of the graphic image data to be transmitted to the communication control unit 210 based on an instruction from the CPU 105. The attribute information includes the target display luminance when the graphic image data is displayed on the display apparatus 3200. The communication control unit 109 can transmit the graphic image data and the attribute information at an arbitrary timing which may be a timing synchronizing with a vertical synchronization signal of a video signal including captured image data output from the video output unit 108, a timing of a constant cycle, or a timing when the graphic image is updated.

The display apparatus 3200 is an exemplary embodiment of an image processing apparatus of the disclosure. In the display apparatus 3200, the communication control unit 210 functions as an image obtaining unit for obtaining a graphic image to be displayed on the display unit 205. The communication control unit 210 obtains the graphic image data and the attribute information associated with the graphic image data which are received from the communication control unit 109 and stores the obtained graphic image data and attribute information in the storage unit 206.

A combining unit 321 functions as a correction unit for generating the corrected graphic image data by reading the graphic image data and the attribute information stored in the storage unit 206 and correcting the pixel value of the graphic image data based on the display range conversion characteristic information and the target display luminance indicated by the attribute information. The combining unit 321 further functions as an output unit for generating the display data by combining the captured image data input from the image processing unit 204 and the corrected graphic image data and outputting the corrected graphic image data to the display unit 205.

The combining unit 321 generates the corrected graphic image data by the procedures similar to the procedures that the gain calculation unit 110 and the gain addition unit 111 according to the first exemplary embodiment generates the corrected graphic image data. The combining unit 321 switches whether to generate the corrected graphic image corresponding to the conversion characteristic of the normalizing method or the corrected graphic image corresponding to the conversion characteristic of the limiting method based on a content of setting received by the operation unit 208.

As described above, in the display system 1 according to the third exemplary embodiment, the combining unit 321 of the display apparatus 3200 generates the corrected graphic image based on the display range conversion characteristic information and the target display luminance and outputs the generated corrected graphic image to the display unit 205. Accordingly, if the image capturing apparatus 3100 does not have a function of generating the corrected graphic image data, the display apparatus 3200 can display the graphic image in constant display luminance.

According to the third exemplary embodiment, the image capturing apparatus 3100 separately transmits the captured image data and the graphic image data to the display apparatus 3200. In contrast, a fourth exemplary embodiment is different from the third exemplary embodiment in that an image capturing apparatus transmits image data obtained by combining captured image data and graphic image data to a display apparatus.

Figure 15:
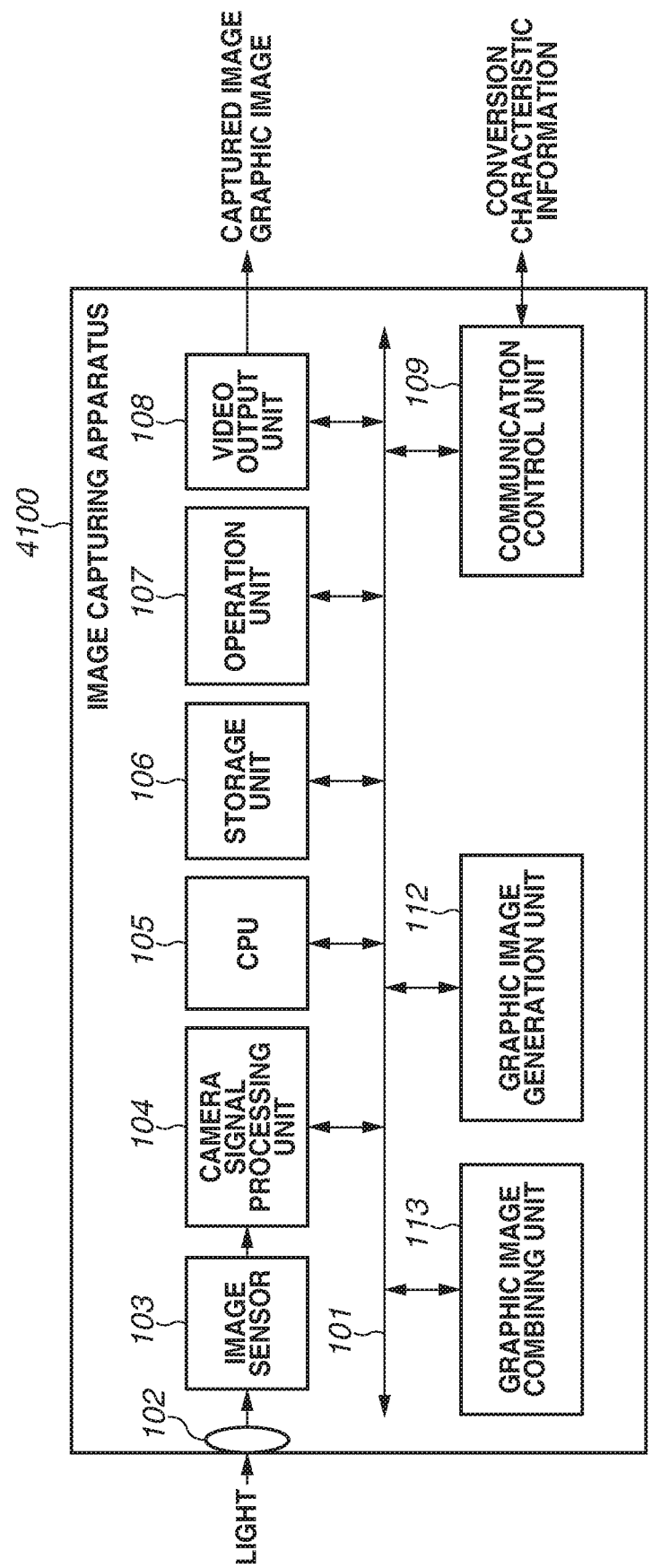
FIG. 15 illustrates a configuration of an image capturing apparatus 4100 according to a fourth exemplary embodiment.
Figure 16:
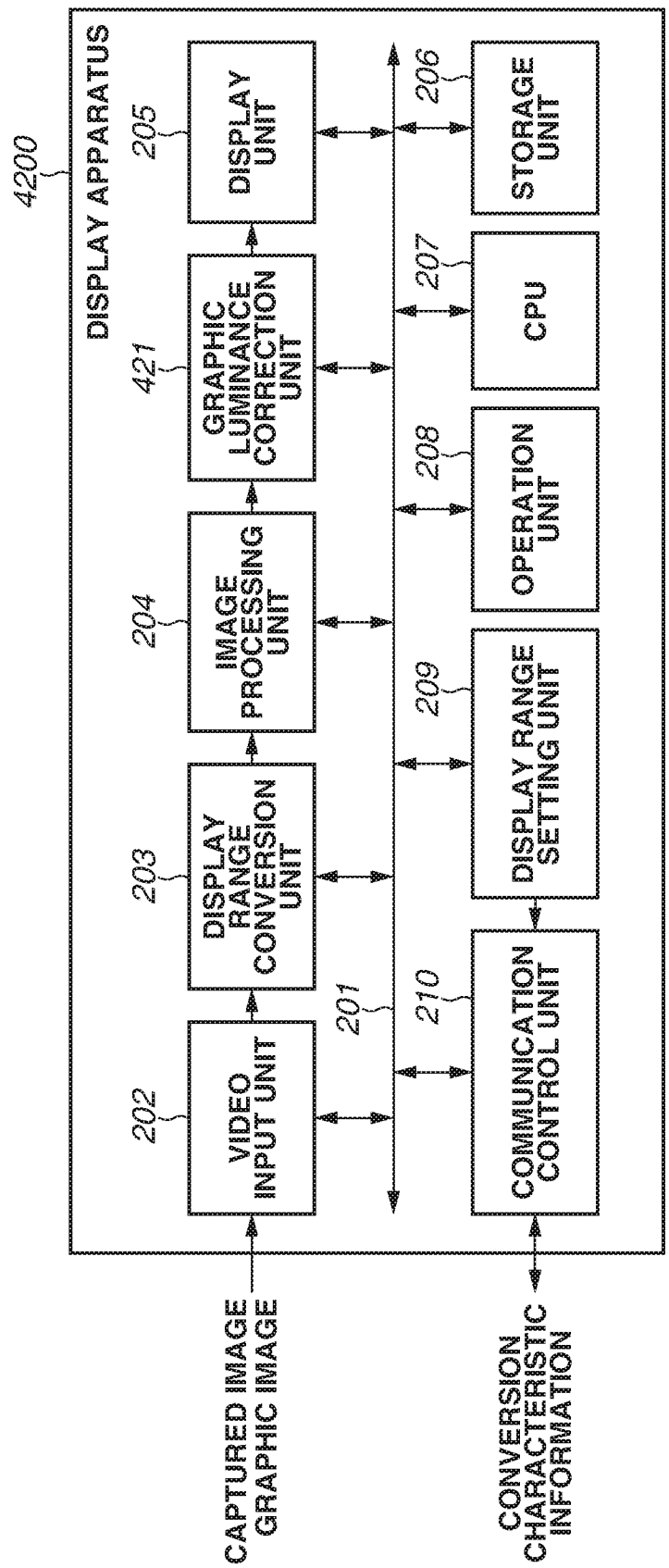
FIG. 16 illustrates a configuration of a display apparatus 4200 according to the fourth exemplary embodiment.

FIG. 15 illustrates a configuration of an image capturing apparatus 4100 according to the fourth exemplary embodiment. FIG. 16 illustrates a configuration of a display apparatus 4200 according to the fourth exemplary embodiment.

The image capturing apparatus 4100 illustrated in FIG. 15 is different from the image capturing apparatus 3100 illustrated in FIG. 13 in that the graphic image combining unit 113 is included therein. The display apparatus 4200 illustrated in FIG. 16 is different from the display apparatus 3200 illustrated in FIG. 14 in that a graphic luminance correction unit 421 is included therein instead of the combining unit 321.

When the graphic image data is combined with the captured image data, the graphic image combining unit 113 notifies the CPU 105 of coordinate information indicating a position of the graphic image as area information for specifying an area of the graphic image in the captured image data. The coordinate information is information indicating coordinates, for example, by regarding a first pixel of a video signal in vertical and horizontal effective periods as (0, 0) and adding pixel numbers in a vertical direction and a horizontal direction. The coordinate information may be information indicating coordinates of a reference position (for example, coordinates (0, 0)) and a size of the graphic image (respective pixel numbers in the vertical direction and the horizontal direction). The communication control unit 109 transmits the coordinate information generated by the graphic image combining unit 113 to the display apparatus 4200 based on an instruction from the CPU 105.

In the display apparatus 4200, the communication control unit 210 stores the area information including the coordinate information received from the communication control unit 109 in the storage unit 206.

The graphic luminance correction unit 421 obtains the coordinate information of the graphic image stored in the storage unit 206 based on an instruction from the CPU 207. The graphic luminance correction unit 421 specifies the area of the graphic image in the image data subjected to the image processing input from the image processing unit 204 based on the coordinate information, corrects the pixel value of the graphic image data corresponding to the specified area based on the display range conversion characteristic information and the target display luminance indicated by the attribute information, and thus generates the corrected graphic image data. The graphic luminance correction unit 421 generates the corrected graphic image data by the procedures similar to the procedures that the gain calculation unit 110 and the gain addition unit 111 according to the first exemplary embodiment generates the corrected graphic image data.

If the image capturing apparatus 4100 does not have a function of transmitting the coordinate information of an area in which the graphic image is superimposed, the display apparatus 4200 may detect the area in which the graphic image is superimposed by the graphic luminance correction unit 421 and correct the pixel value of the graphic image in the detected area to be the target display luminance.

Further, when the video signal level of the graphic image data included in the image data output from the image capturing apparatus 4100 is greater than the limit value of the display range conversion characteristic of the limiting method, the display luminance of the graphic image data is fixed to 400 nit by the conversion processing by the display range conversion unit 203, and thus a situation is caused in which a user cannot visually confirm the graphic image. Thus, when the limiting method is selected as the conversion characteristic type, the display apparatus 4200 may notify the image capturing apparatus 4100 of the limit value, and the image capturing apparatus 4100 may control the pixel value of the graphic image so as not to be greater than or equal to 400% which is the video signal level corresponding to the limit value. Accordingly, the video signal level of the graphic image data in the image data input to the display apparatus 4200 becomes less than 400%, and a situation can be prevented in which a user cannot visually confirm the graphic image.

As described above, in the display system 1 according to the fourth exemplary embodiment, the image capturing apparatus 4100 transmits the coordinate information indicating the position of the graphic image superimposed on the captured image to the display apparatus 4200, and the display apparatus 4200 corrects the pixel value in the area specified by the coordinate information and thus generates the display data. Accordingly, if the image capturing apparatus 4100 does not have a function of generating the corrected graphic image data and a function of independently transmitting the corrected graphic image data, the display apparatus 4200 can display the graphic image in constant display luminance.

FIGS. 17A and 17B illustrate a configuration of a display system 10 according to a fifth exemplary embodiment. The display system 10 is different from each of the above-described exemplary embodiments in that an image capturing apparatus 5100, a display apparatus 5200, and an image processing apparatus 5300 are included therein. The image processing apparatus 5300 is, for example, a computer and functions as an image obtaining unit for obtaining captured image data and graphic image data from the image capturing apparatus 5100 and an output unit for outputting corrected graphic image data to the display apparatus 5200 by executing a program stored in a storage medium.

The output unit generates the corrected graphic image data by correcting the graphic image data input from the image capturing apparatus 5100 based on the display range conversion characteristic information and the target display luminance and outputs the corrected graphic image data to the display apparatus 5200 as with the video output unit 108 according to the first exemplary embodiment.

The image processing apparatus 5300 can obtain the display range conversion characteristic information from the display apparatus 5200 and may use the display range conversion characteristic information set by a user using an operation unit of the image processing apparatus 5300. Further, the image processing apparatus 5300 may obtain the target display luminance from the image capturing apparatus 5100 as illustrated in FIG. 17A and may obtain the target display luminance from the display apparatus 5200 as illustrated in FIG. 17B. The image processing apparatus 5300 may use the target display luminance set by a user using the operation unit of the image processing apparatus 5300.

As described above, in the display system 10 according to the fifth exemplary embodiment, the image processing apparatus 5300 generates the corrected graphic image data and outputs the corrected graphic image data to the display apparatus 5200. Accordingly, if the image capturing apparatus 5100 and the display apparatus 5200 do not have a function of correcting the graphic image data, the display apparatus 5200 can display the graphic image in constant display luminance.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that, includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applicaton No. 2016-087340, filed Apr. 25, 2016, which is hereby incorporated by reference herein in its entirety.

What is claimed is:

1. An image capturing apparatus comprising:
   an image sensor configured to generate a captured image of an object;
   an image generation unit configured to generate a graphic image to be displayed on a display apparatus;
   an information obtaining unit configured to obtain, from the display apparatus, display luminance range conversion characteristic information indicating a correspondence relationship between pixel values of a display image based on a captured image input from the image capturing apparatus to the display apparatus and display luminance values in a state in which the display image is displayed on the display apparatus; and
   an output unit configured to output, to the display apparatus together with the captured image, a corrected graphic image obtained by correcting a pixel value of the graphic image based on the conversion characteristic information,
   wherein at least one processor functions as the image generation unit, the information obtaining unit and the output unit.

2. The image capturing apparatus according to claim 1, wherein the information obtaining unit obtains a target value from the display apparatus.

3. The image capturing apparatus according to claim 1 further comprising a correction unit configured to generate the corrected graphic image by correcting the pixel value of the graphic image based on a ratio of the pixel value of the graphic image to the display luminance value in a state in which the graphic image is displayed and a target value which are specified based on the conversion characteristic information, wherein the at least one processor functions as the image generation unit, the information obtaining unit, the output unit and the correction unit.

4. The image capturing apparatus according to claim 3, wherein
   the information obtaining unit obtains the conversion characteristic information in a case that the conversion characteristic information is changed in the display apparatus, and
   the correction unit changes a gain value used for generating the corrected graphic image in response to that the information obtaining unit obtains the conversion characteristic information.

5. The image capturing apparatus according to claim 1, wherein the output unit output, to the display apparatus together with the captured image, the corrected graphic image obtained by correcting a pixel value of the graphic image based on the conversion characteristic information and a target value of a display luminance value of the graphic image when the graphic image is displayed on the display apparatus.

6. The image capturing apparatus according to claim 5, wherein the output unit outputs:
   a first corrected graphic image if the conversion characteristic information is first conversion characteristic information, and
   a second corrected graphic image if the conversion characteristic information is second conversion characteristic information which is different from the first conversion characteristic information, and wherein a pixel value of the first corrected graphic image and a pixel value of the second corrected graphic image are different from each other.

7. A display system comprising an image capturing apparatus configured to generate a captured image of an object and a display apparatus configured to display the captured image, wherein the image capturing apparatus comprises:
an image sensor configured to generate the captured image;
an image generation unit configured to generate a graphic image to be displayed on the display apparatus; and
an output unit configured to output, to the display apparatus together with the captured image, a corrected graphic image obtained by correcting a pixel value of the graphic image based on display luminance range conversion characteristic information indicating a relationship between pixel values of a display image input to the display apparatus and display luminance values in a state in which the display image is displayed on the display apparatus, and wherein the display apparatus comprises:
a display unit configured to display data obtained by converting pixel values of the captured image and the graphic image based on the conversion characteristic information; and
a communication control unit configured to transmit the conversion characteristic information to the image capturing apparatus,
wherein at least one processor functions as the image generation unit, the output unit, the display unit and the communication control unit.

8. A control method of an image capturing apparatus, the method comprising:
generating a captured image of an object;
generating a graphic image to be displayed on a display apparatus;
obtaining, from the display apparatus, display luminance range conversion characteristic information indicating a correspondence relationship between pixel values of a display image based on a captured image input from the image capturing apparatus to the display apparatus and display luminance values in a state in which the display image is displayed on the display apparatus; and
outputting, to the display apparatus together with the captured image, a corrected graphic image obtained by correcting a pixel value of the graphic image based on the conversion characteristic information.

9. The control method according to claim 8, wherein the obtaining obtains a target value from the display, apparatus.

10. The control method according to claim 8 further comprising generating the corrected graphic image by correcting the pixel value of the graphic image based on a ratio of the pixel value of the graphic image to the display luminance value in a state in which the graphic image k displayed and a target value which are specified based on the conversion characteristic information.

11. The control method according to claim 8, wherein the outputting outputs, to the display apparatus together with the captured image, the corrected graphic image obtained by correcting a pixel value of the graphic image based on the conversion characteristic information and a target value of a display luminance value of the graphic image when the graphic image is displayed on the display apparatus.

12. The control method according to claim 11, wherein the outputting outputs:
a first corrected graphic image if the conversion characteristic information is first conversion characteristic information, and
a second corrected graphic image if the conversion characteristic information is second conversion characteristic information which is different from the first conversion characteristic information, and
wherein a pixel value of the first corrected graphic image and a pixel value of the second corrected graphic image are different from each other.

13. A non-transitory computer-readable storage medium storing a program for causing a computer to execute a control method of an image capturing apparatus, the method comprising:
generating a captured image of an object;
generating a graphic image to be displayed on a display apparatus;
obtaining, from the display apparatus, display luminance range conversion characteristic information indicating a correspondence relationship between pixel values of a display image based on a captured image input from the image capturing apparatus to the display apparatus and display luminance values in a state in which the display image is displayed on the display apparatus; and
outputting, to the display apparatus together with the captured image, a corrected graphic image obtained by correcting a pixel value of the graphic image based on the conversion characteristic information.

14. The non-transitory computer-readable storage medium according to claim 13, wherein the obtaining obtains a target value from the display apparatus.

15. The non-transitory computer-readable storage medium according to claim 13 further comprising generating the corrected graphic image by correcting the pixel value of the graphic image based on a ratio of the pixel value of the graphic image to the display luminance value in a state in which the graphic image is displayed and a target value which are specified based on the conversion characteristic information.

16. The non-transitory computer-readable storage medium according to claim 13, wherein the outputting outputs, to the display apparatus together with the captured image, the corrected graphic image obtained by correcting a pixel value of the graphic image based on the conversion characteristic information and a target value of a display luminance value of the graphic image when the graphic image is displayed on the display apparatus.

17. The non-transitory computer-readable storage medium according to claim 16, wherein the outputting outputs:
a first corrected graphic image if the conversion characteristic information is first conversion characteristic information, and
a second corrected graphic image if the conversion characteristic information is second conversion characteristic information which is different from the first conversion characteristic information, and
wherein a pixel value of the first corrected graphic image and a pixel value of the second corrected graphic image are different from each other.

* * * * *